UNITED STATES PATENT OFFICE.

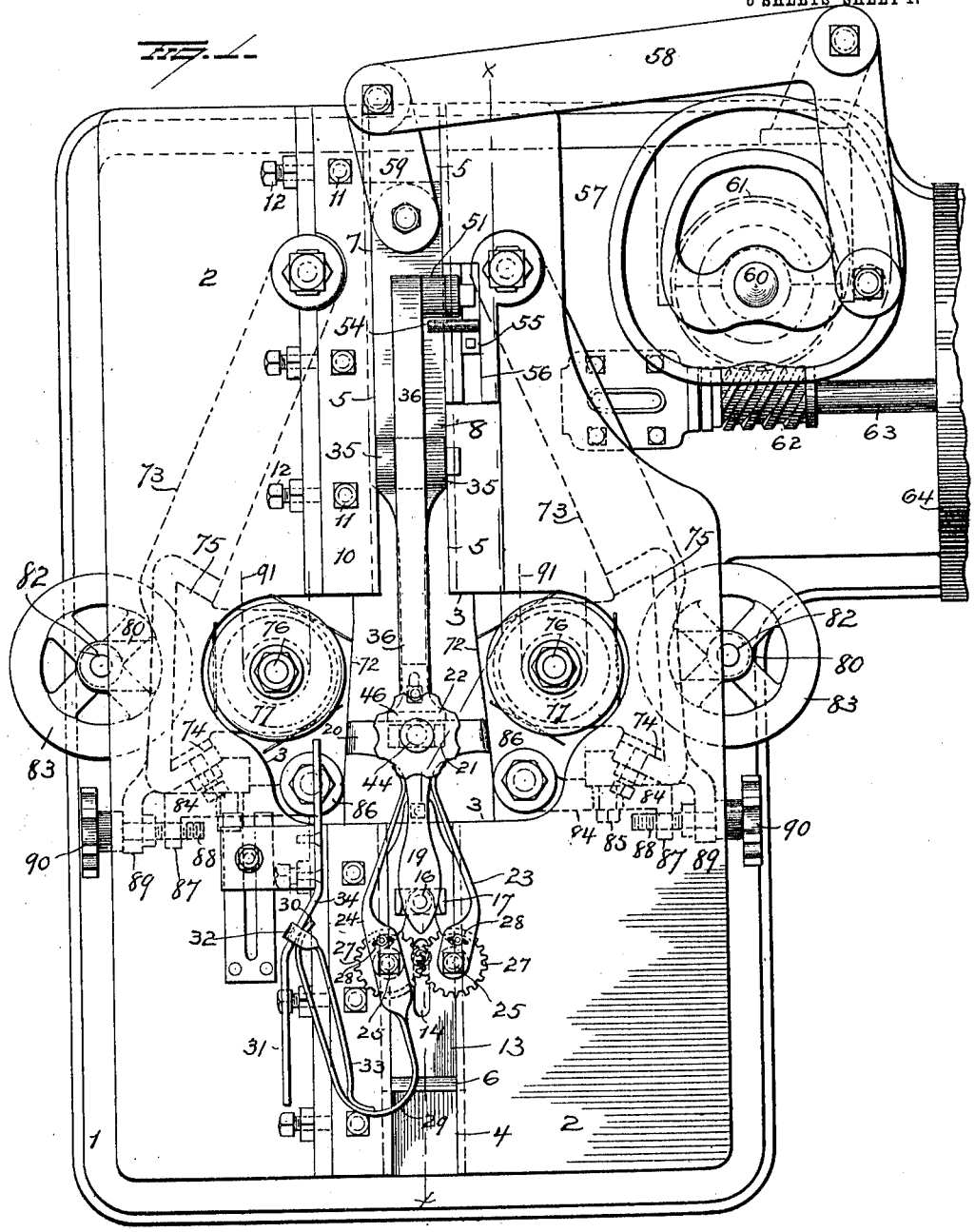
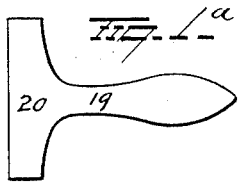
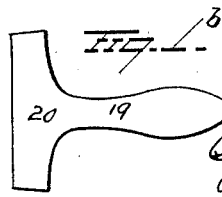

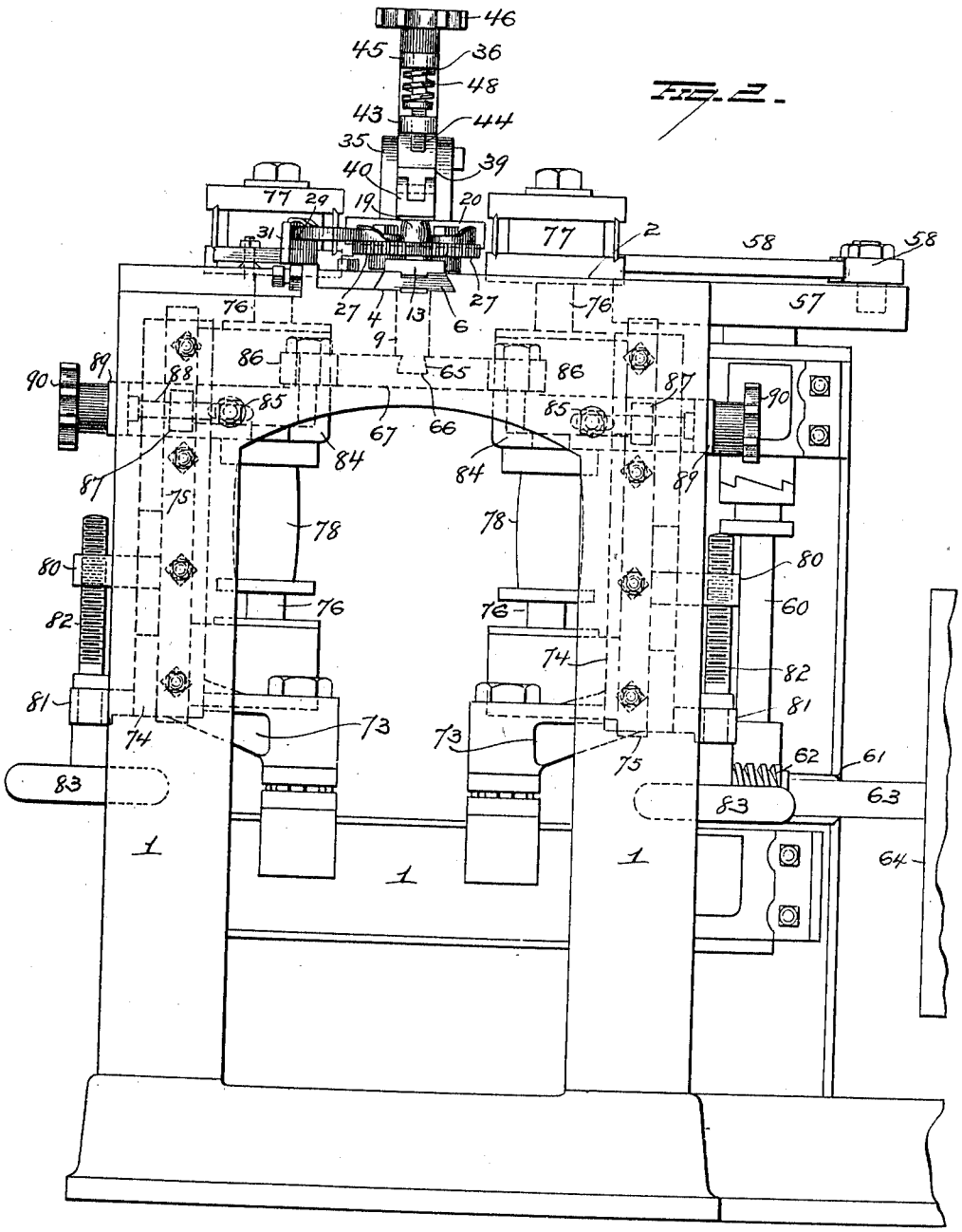

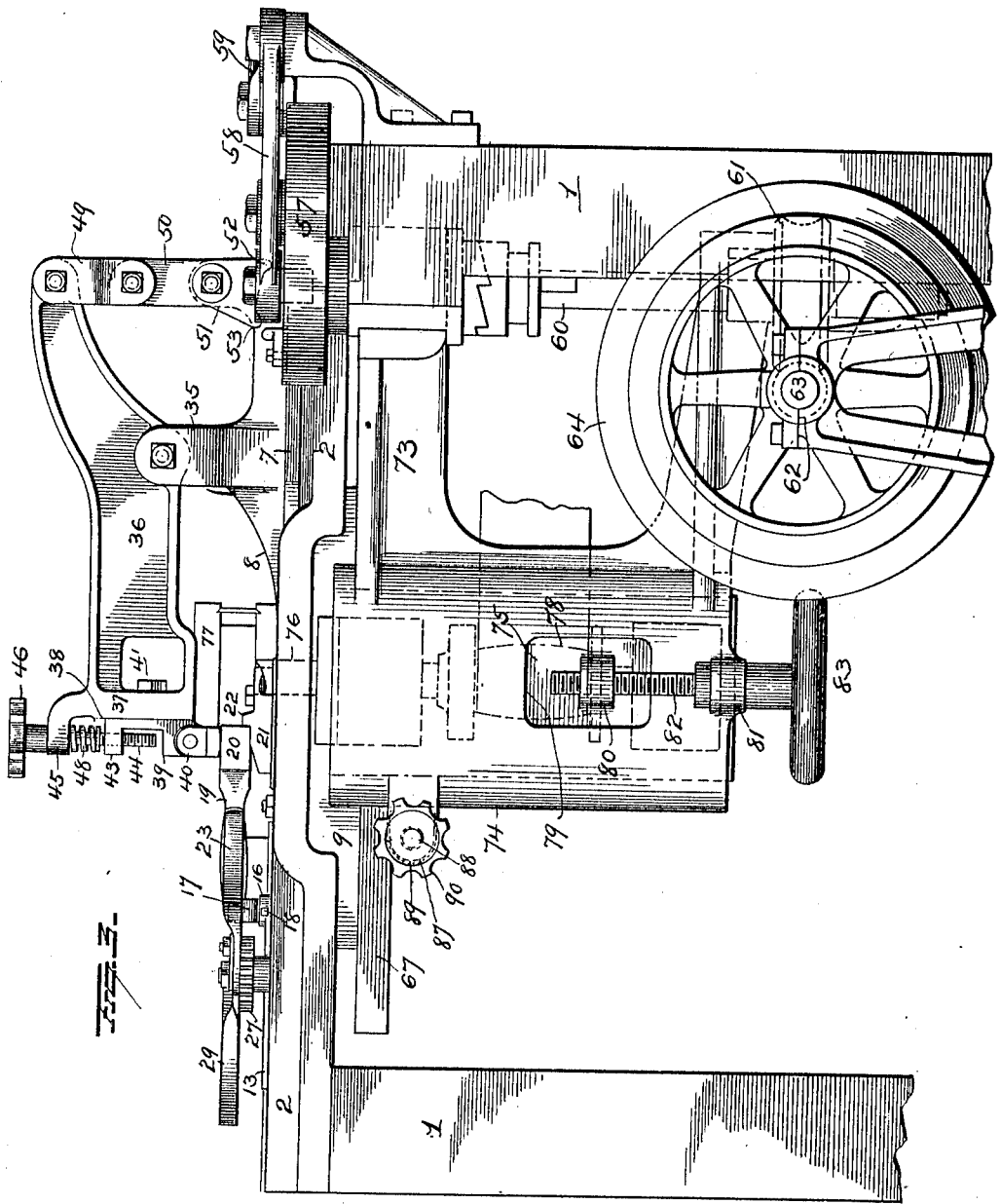

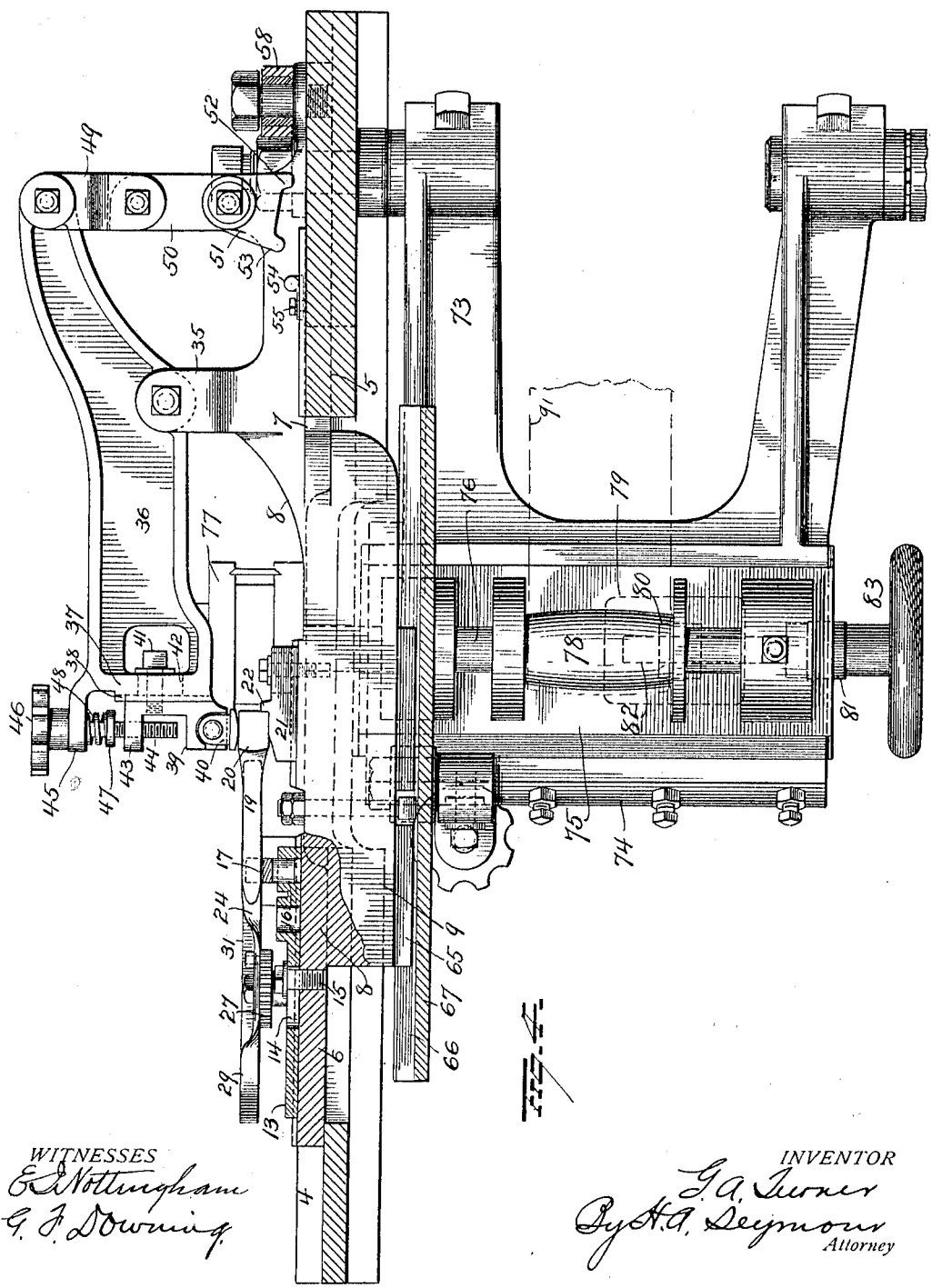

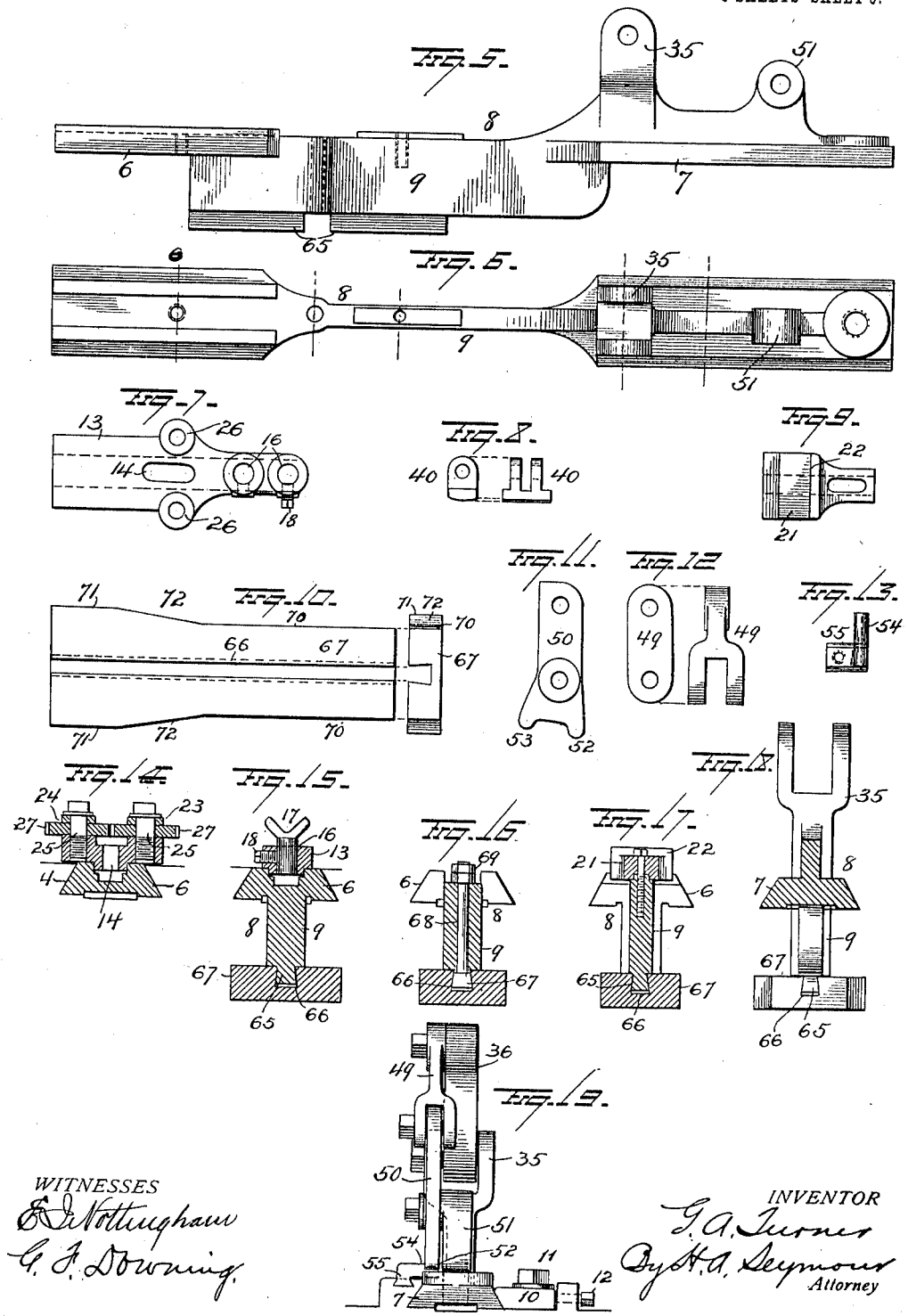

GEORGE A. TURNER, OF KANE, PENNSYLVANIA, ASSIGNOR TO HOLGATE BROTHERS COMPANY, OF KANE, PENNSYLVANIA.

WOODWORKING-MACHINE.

1,066,685.  Specification of Letters Patent.  Patented July 8, 1913.

Application filed April 1, 1912.  Serial No. 687,687.

*To all whom it may concern:*

Be it known that I, GEORGE A. TURNER, a citizen of the United States, residing at Kane, in the county of McKean and State of Pennsylvania, have invented certain new and useful Improvements in Woodworking-Machines; and I do hereby declare the following to be a full, clear, and exact description of the invention, such as will enable others skilled in the art to which it appertains to make and use the same.

This invention relates to improvements in wood-working machines—the object of the invention being to provide a machine which will operate accurately to bevel and round the ends of the head of a brush handle.

With this object in view, the invention consists in certain novel features of construction and combinations of parts as hereinafter set forth and pointed out in the claims.

In the accompanying drawings, Figure 1 is a plan view of a machine embodying my improvements; Fig. 1ª is a view of a handle blank; Fig. 1ᵇ is a view of the handle after the ends of the head have been beveled; Fig. 2 is an end view; Fig. 3 is a side elevation; Fig. 4 is a longitudinal sectional view; Fig. 5 is a side elevation of the carriage; Fig. 6 is a plan view of the carriage; Figs. 7 to 13 inclusive are views illustrating various details; Fig. 14 is a view in section on line *a—a* of Fig. 1; Fig. 15 is a section on line *b—b* of Fig. 1; Fig. 16 is a view on the line *d—d* of Fig. 1; Fig. 17 is a view on the line *f—f* of Fig. 1; Fig. 18 is a view on the line *e—e* of Fig. 1, and Fig. 19 is an end view of the carriage and some of the coöperating parts.

1 represents a frame provided with a table 2 having an opening 3, and on said table, alining guideways 4—5 are located, each of said guideways communicating at its inner end with the opening 3. The walls of the guideways 4—5 are undercut to accommodate the dove-tail base portions 6—7 of a carriage 8, which latter also includes in its structure, a narrow and deeper portion 9 depending through the opening 3 in the table. One side portion 10 of each guideway, 4—5 is made adjustable laterally and held in position by means of set screws 11—12.

Located upon the portion 6 of the carriage 8, is a plate 13 having therein, an elongated slot 14 for the accommodation of a bolt or screw 15 secured to the carriage for the purpose of securing said plate at any desired adjustment. Near its forward end the plate 13 is provided with a plurality of perforated bosses or sockets 16, in one of which, the shank of a bifurcated support 17 is supported as shown in Fig. 4 and secured in position by a set screw 18 as shown in Fig. 15. The bifurcated support 17 receives the shank portion of a brush handle 19, the head portion 20 of said handle resting upon a block 21 adjustably secured to the intermediate part 9 of the carriage and provided with a shoulder 22 against which the forward end of said head 20 abuts as clearly shown in Fig. 4. The handle 19 is held in position on the supports 17 and 21; and before said handle is firmly clamped; by means of spring jaws 23—24. These jaws are mounted on the plain portions of screws 25 secured in bosses 26 located at the side edges of the plate 13 intermediate the ends of the latter as shown in Fig. 7. The forward ends of the jaws 23—24 are curved and engage the sides of the handle 19 at the juncture of the shank and head thereof as shown in Fig. 1—thus serving to hold the handle against lateral displacement and to insure the proper positioning of the handle before it shall be clamped as presently explained. The jaws 23—24 are moved toward the brush handle by the operation of pinions 27 to which said jaws are adjustably secured by means of set screws 28. The jaw 24 is made with an integral arm 29 which has a general U-shape and its free curved end 30 bears against a rail 31. A loop 32 embraces the curved portion 30 of the arm 29 and the rail 31 and this loop is connected, by an arm 33 with which it is integral, with the intermediate portion of said arm 29. The rail 31 comprises two portions disposed in parallel planes, and a diagonal intermediate connecting portion 34 which constitutes, in effect, a cam for operating the spring jaws 23—24, through the medium of the U-shaped arm 29 and the pinions 27, when the carriage 8 is reciprocated.

A bifurcated standard 35 rises from the carriage 8 at or near the inner end of the portion 7 of the latter, and in this standard, a lever 36 is pivotally supported between its ends. The lever 36 is provided at one end with a head or enlargement 37 and the latter is made with a guide-way 38 for a vertically movable clamp-block 39 carrying a pivoted jaw 40 to engage the head 20 of the brush handle 19 and hold the same firmly on the block 21 during the cutting operation hereinafter to be described. The clamp-block 39 is connected with the lever head 37 by means of a headed screw 41 secured to said clamp-block and movable through a vertical slot 42 in said lever head 37. The clamp block 39 is provided with a lug 43 having a threaded hole for the passage of a hand-operated screw 44. The plain upper portion of this screw 44 passes freely through a hole in a lug or projection 45 on the lever 39 and is provided with a hand wheel 46. The screw 44 is also provided, at the intersection of its threaded and plain portions, with a fixed collar 47,—between which and the lug 45, a spring 48 is located and serves to force the jaw 40 against the head 20 of the brush handle with a yielding pressure, when the parts are in the positions shown in Fig. 4.

The rear end of the short arm of the lever 36, is connected with a link 49 and the latter is connected by a rule-joint with one arm of a lever 50. This lever is pivotally mounted on a suitable support 51 rising from the carriage 8 near the rear end of the latter, and the shorter arm of said lever 50 is provided with two lugs 52—53 to be engaged by a trip pin 54 carried by a block 55 adjustably secured in a guide-way 56 on the table 2.

In the drawings, the carriage is shown in a position intermediate the ends of its travel. As the carriage 8 moves backwardly from the position shown in Fig. 4, the lug 52 of lever 50 will engage the trip pin 54 and said lever will be turned on its fulcrum, causing the upper end of said lever and the lower end of the link 49 to move back and the lever 36 to be turned on its fulcrum to raise the clamping jaw 40 and release the head of the brush handle.

For reciprocating the carriage 8, a cam 57 is employed, said cam being connected through the medium of a bell-crank lever 58 and a link 59, with the carriage as clearly shown in Fig. 1. The cam 57 is secured to a shaft 60 carrying a worm wheel 61 and the latter receives motion from a worm 62 on a shaft 63. A pulley 64 is secured to the shaft 63 and receives motion from any suitable source of power.

The intermediate portion 9 of the carriage 8 is provided on its lower edge with a dove-tail rib or flange 65 to enter a similarly-shaped groove 66 in a guide or cam plate 67 and support the latter at the bottom of the carriage. The rib or flange 65 is notched for the accommodation of the dove-tail head 67ᵃ of a bolt 68,—which latter passes upwardly through the carriage and is provided at its upper end with nuts 69. This bolt serves to secure the guide or cam plate to the carriage at any desired position of longitudinal adjustment. As shown in Fig. 10, the guide plate 67 is constructed at each side with edge portions 70—71 in parallel planes and a diagonal edge portion 72 connecting the edge portions 70 and 71. The guide or crank plate 67 serves, by reason of its form as above described, to control the feeding of the cutters toward the work, as will be hereinafter explained.

Two arms 73—73 are pivotally connected with the frame-work near the forward end thereof and extend under the table 2 toward the central portion of the frame-work, said arms terminating at their inner ends in heads 74 having dove-tail grooves, in which vertically movable bars 75 are disposed. Each bar 75 is provided with bearings for a vertical shaft 76, which is provided at its upper end with a cutter head 77 and between its ends with a pulley 78. The cutter heads are located over the opening 3 in the table 2 and at respective sides of and laterally beyond the carriage 8 as clearly shown in Fig. 1. The head 74 of each arm 73 is made with an opening 79 (Fig. 3) through which a lug 80 on the bar 75, passes. A lug 81 is also made at the lower end of each head and in said lug 81 a vertical screw 82 is swiveled the threaded portion of said screw passing through a threaded hole in the lug 80 of bar 75. Each screw 82 is provided at its lower end with a hand wheel 83 for operating the same to effect vertical adjustment of the cutter heads. A bar 84 is adjustably attached to the head 74 of each arm 73 by means of a screw bolt 85, the bar being provided with an elongated slot through which screw bolt passes. At the inner ends of the bars 84, rollers 86 are mounted to run against the side edges of the guide or cam plate 67, and at their outer ends, said bars are provided with lugs 87 having threaded holes for the passage of screws 88 for adjusting the bars 84 and the rollers 86,—said screws passing through lugs 89 on the heads 74 and provided with hand wheels 90 for turning them. Belts 91 (from any suitable source of power) pass about the pulleys 78 for driving the shafts 76 on which the cutter heads 77 are secured and these belts are so disposed that they will tend to cause the rollers 86 to bear against the side edges of the cam plate 67 and to cause the cutter heads to move toward each other when permitted to do so by the cam plate.

As previously stated, the purpose of the machine, is to bevel and round the ends of the heads of brush handles, and in accomplishing this, the machine will be operated as follows:—The work to be operated upon is a handle having the configuration shown in Fig. 1ᵃ, the ends of the head portion 20 being approximately square and at right angles to the free forward edge of said head. The supports 17 and 21; the cam rail 31; and the cam plate, will be first adjusted in accordance with the length of the handle to be operated upon, and the rollers 86 will be adjusted to insure the proper extent of cut to be made at the ends of the handle head. The work, consisting of a handle such as shown in Fig. 1ª, will then be placed in position with the shank portion resting upon the bifurcated support 17 and the head portion resting upon the block or support 21 and abutting against the shoulder 22. The application of power to the shaft 60 will cause rotation of the cam 57 and the latter will (during a portion of its rotation) impart motion, through the bell-crank lever 58 and link 59, to the carriage 8 to move the latter forwardly and said cam will also operate (during another portion of its rotation) to move the carriage backwardly so that during the operation of the machine and during another portion of the rotation of the cam the carriage will remain idle to permit removal of finished handle and insertion of a blank. The work having been placed in the position above mentioned when the carriage approximates the back end of its travel, the U-shaped arm will move on the cam or diagonal portion 34 of the rail 31 and cause the spring jaws or fingers 23—24 to move from their open positions to the positions shown in Fig. 1,—the said spring jaws or fingers being thus caused to engage the work and properly position the same on its supports 17 and 21 and said jaws or fingers will remain in contact with the work during the remainder of the forward travel of the carriage and until the end of the U-shaped arm 28 reaches the portion 34 of the cam rail 31 during the forward movement of the carriage. After the work has been positioned by the spring jaws or fingers 23—24 and during the forward movement of the carriage, the trip pin 54 will be engaged by the lug or toe 53 of lever 50 and move said lever to the position shown in Fig. 4, thus operating the lever 36 and causing the clamping jaw 40 to engage the head 20 of the work and hold it firmly to its seat on the block 21. The work having been properly positioned and clamped, the carriage is caused, by the operation of the cam 57, to continue to move forwardly, and carry the work between the cutter heads 77—77. During such forward movement, the cam plate 67, moving in contact with the rollers 86, will permit the arms 73 to turn on their pivotal supports and the cutter heads to move away from each other and the line of travel of the ends of the head 20 of the work, while cam edges 72 are passing said rollers. The outward movement of the cutter heads is limited by the width of the wider portion of the cam plate 67. It will be observed that the work will travel in a straight line and that at the same time (and while the work is being subjected to the action of the cutters) the cutter heads will be moving away from each other. In consequence of these relative movements of the work and the cutter heads during the cutting operation, the ends of the head 20 of the work will be beveled as shown in Figs. 1 and 1ᵇ and the configuration of these beveled ends can be determined by the form or shape of cutting edges of the cutters used. On the return or backward movement of the carriage the lug or toe of lever 50 will engage the trip pin 54 and break the toggle formed by this lever and the link 49,—thus operating the lever 36 to raise its longer arm and release the clamping jaw 40 from the work. As the carriage recedes, the cutter heads will be moved inwardly by the operation of the cam plate 67 and after the handle has passed backwardly beyond the cutters, the spring jaws 23—24 will be opened by the cam rail 31 and said handle can be removed and blank placed in position, in the manner previously explained. When the new blank has been placed in position, the spring jaws 23—24 will close and position the same and the said handle will then be clamped, during the travel of the carriage, as previously explained.

It is apparent that by providing cam plates 67 of different dimensions, and adjusting the parts of the mechanism, the machine can be readily adapted to bevel the ends of heads of brush handles of different sizes.

Various changes might be made in the details of construction of my invention without departing from the spirit thereof or limiting its scope and hence I do not wish to restrict myself to the exact details herein set forth.

Having fully described my invention what I claim as new and desire to secure by Letters-Patent, is:—

1. In a wood working machine, the combination with framework, of a carriage, means for reciprocating the carriage, supports for work on the carriage, positioning fingers on the carriage, means for moving said fingers toward and away from the work, clamping means for the work, cutters at respective sides of the carriage and means for moving said cutters relatively to the work during the reciprocating movements of the work with the carriage.

2. In a wood working machine, the combination with framework, of a carriage, means for reciprocating the same, supports for work on the carriage, positioning fingers for the work on the carriage intermeshing pinions secured to said fingers, an arm projecting from one of said fingers, a cam-rail with which said arm coöperates to move the fingers toward and away from the work, cutters at respective sides of the carriage and means for operating said cutters.

3. In a wood working machine, the combination with framework, of cutters, means for operating the same, a carriage movable between the cutters, means for reciprocating the carriage, a work support on the carriage, a pivoted lever on the carriage, a clamping jaw carried by one end of said lever and adapted to engage the work, a link pivoted to the other end of said lever, a lever pivoted between its ends to said link and provided at its other end with toes, and means on the framework to be engaged by said toes to control the operation of the first-mentioned lever and the clamping jaw carried thereby.

4. In a wood working machine, the combination with framework, of two cutters, means for operating the same, a carriage movable between the cutters, means for reciprocating said carriage, a plate adjustably secured upon the carriage, a work support near one end of said plate, intermeshing pinions mounted on said plate, spring fingers secured to said pinions, an arm projecting from one of said fingers, an adjustable cam rail with which said arm coöperates to operate said spring fingers relatively to the work, a block adjustably secured on the carriage and provided with a shoulder to receive one end of the work, a clamp, and means operable by the movements of the carriage to operate said clamp to hold the work on said block or release it therefrom.

In testimony whereof, I have signed this specification in the presence of two subscribing witnesses.

GEORGE A. TURNER.

Witnesses:
W. R. DAVIS,
DENNIE DAVIS.

---

Copies of this patent may be obtained for five cents each, by addressing the "Commissioner of Patents, Washington, D. C."